(12) United States Patent
Lai et al.

(10) Patent No.: US 8,076,497 B2
(45) Date of Patent: Dec. 13, 2011

(54) PRODUCTION OF ACYLGLYCEROL ESTERS

(75) Inventors: Oi Ming Lai, Selangor Darul Ehsan (MY); Mohd Suria Affandi Yusoff, Selangor Darul Ehsan (MY); Seong Koon Lo, Selangor Darul Ehsan (MY); Kamariah Long, Selangor Darul Ehsan (MY); Chin Ping Tan, Selangor Darul Ehsan (MY); Shawaluddin Tahiruddin, Selangor Darul Ehsan (MY); Khairudin Hashim, Selangor Darul Ehsan (MY)

(73) Assignees: Universiti Putra Malaysia, Selangor (MY); Golden Hope Research Sendirian Berhad, Kuala Lumpur (MY)

( * ) Notice: Subject to any disclaimer, the term of this patent is extended or adjusted under 35 U.S.C. 154(b) by 330 days.

(21) Appl. No.: 12/302,880

(22) PCT Filed: Apr. 23, 2007

(86) PCT No.: PCT/MY2007/000025
§ 371 (c)(1),
(2), (4) Date: Nov. 28, 2008

(87) PCT Pub. No.: WO2008/026909
PCT Pub. Date: Mar. 6, 2008

(65) Prior Publication Data
US 2010/0256403 A1    Oct. 7, 2010

(30) Foreign Application Priority Data
Aug. 28, 2006  (MY) ............... PI 2006 4041

(51) Int. Cl.
*C07C 51/00* (2006.01)

(52) U.S. Cl. ......... 554/174; 554/124; 554/161; 554/223
(58) Field of Classification Search ................... 554/124, 554/161, 173, 223
See application file for complete search history.

(56) References Cited

U.S. PATENT DOCUMENTS

| | | | |
|---|---|---|---|
| 5,362,894 A * | 11/1994 | Handwerker et al. | ......... 554/169 |
| 6,261,812 B1 | 7/2001 | Yamada et al. | |
| 6,361,980 B2 | 3/2002 | Sugiura et al. | |
| 7,081,542 B2 | 7/2006 | Jacobs et al. | |
| 2001/0004462 A1 | 6/2001 | Sugiura et al. | |
| 2003/0104109 A1 | 6/2003 | Jacobs et al. | |
| 2004/0171127 A1 | 9/2004 | Akimoto et al. | |
| 2004/0191391 A1 | 9/2004 | Takeuchi et al. | |

FOREIGN PATENT DOCUMENTS

| | | |
|---|---|---|
| EP | 1 642 959 A1 | 4/2006 |
| JP | 64-071495 | 3/1989 |
| JP | 04-330289 | 11/1992 |
| JP | 10-234391 | 9/1998 |
| WO | 99/09119 | 2/1999 |

* cited by examiner

*Primary Examiner* — Deborah D Carr
(74) *Attorney, Agent, or Firm* — Lowe, Hauptman, Ham & Berner, LLP

(57) ABSTRACT

The present invention relates to the production of oil and fat containing acylglycerol esters including diacylglycerols, medium-chain and long-chain fatty acid triacyglycerols comprising esterification reaction between an acyl group donor and an acyl group acceptor in the presence of a heterogeneous chemical catalyst consisting of an ion-exchange resin preparation to obtain a reaction fluid that is further subjected to dehydration and at least one separation method, thus producing diacylglycerols and/or medium-chain and long-chain fatty acid triacyglycerols at a high yield in a short period of time.

21 Claims, No Drawings

PRODUCTION OF ACYLGLYCEROL ESTERS

RELATED APPLICATIONS

The present application is based on, International Application PCT/MY2007/000025, filed Apr. 23, 2007, which claims priority from, Malaysia Application Number PI 20064041, filed Aug. 28, 2006, the disclosures of which are hereby incorporated by reference herein in their entirety.

The present invention relates to the production of fats and oil containing acylglycerol esters. More particularly, the present invention relates to a method of producing diacylglycerol and triacylglycerol at a high yield and low cost in a short period of time.

BACKGROUND TO THE INVENTION

Glycerol molecule provides three sites for combining with fatty acids to make ester products. Common oils and fats are triesters of glycerol called triacylglycerols, mono- and diacylglycerols are partial glycerol esters that are being increasingly used as emulsifiers in both foods and pharmaceuticals. Currently there is a growing need to make tri- and diacylglycerols that contain specific nutritionally important fatty acids at specified positions on the three-pronged glycerol backbone.

Diacylglycerols are widely used in a variety of applications such as additives for improving plasticity of oils and fats, as well as edible oils in the food industry, and as a base material for the production of cosmetics, drugs, etc. Generally, the preparation of such diacylglycerols involves an esterification reaction of glycerol with its corresponding fatty acid, an alcohol interchange reaction of glycerol with oil or fat, or the like, with the use of an alkali catalyst, or an enzyme such as a lipase, or the like. The use of an enzyme catalyst has been claimed to be the preferable choice, as compared to the chemical reaction process, from the viewpoints of the yield and purity of the diacylglycerols synthesized and energy savings. However, this is only true if the chemical reaction processes make use of conventional alkali catalyst, high reaction temperature and pressure.

Japanese Patent Application No. 71495/1989 discloses lipase-catalysed reaction processes in which a fatty acid or the like is reacted with glycerol in the presence of a 1,3-position selective lipase while removing water formed by the reaction outside the system, to obtain a diacylglycerol at high yield and purity. PCT Patent Application No. WO 99/09119 by Kao Corporation discloses a process for producing high-purity diacylglycerols at a low cost and more efficiently than conventional esterification and glycerolysis processes, which comprises partially hydrolyzing an oil or fat, followed by esterifying the resultant product with glycerol. Japanese Patent Application No. 234391/1998 discloses processes in which a mixture of a fatty acid or the like and glycerol or the like is reacted in a flow tube type reactor filled with a lipase while controlling the superficial velocity of the mixture in the reactor to at least 0.05 cm/s. Japanese Patent Application No. 330289/1992 discloses processes in which glycerol is added in an equimolar amount or more to a fatty acid to react, the reaction is stopped when the concentration of a diacylglycerol has been enhanced, insoluble glycerol is separated, and the reaction is further conducted while dehydrating, thereby synthesizing diacylglycerol at a high esterification reaction rate by improving dehydration efficiency. U.S. Pat. No. 6,361,980 discloses a process for preparing a diacylglycerol, comprising: an enzyme-packed tower comprising an immobilized lipase preparation, carrying out an esterification reaction between: (1) an acyl group donor selected from the group consisting of a fatty acid, a lower alcohol ester thereof, and a mixture thereof; and (2) an acyl group acceptor selected from the group consisting of glycerol, a monoacylglycerol, and a mixture thereof; to obtain a reaction fluid from said enzyme-packed tower; reducing a water content or a lower alcohol content in said reaction fluid; and subsequent to said reducing, re-circulating the reaction fluid to said enzyme-packed tower, wherein a residence time of said reaction fluid in said enzyme-packed tower is 120 seconds or less; to obtain a diacylglycerol, wherein said reducing comprises dehydrating or de-alcoholising said reaction fluid is by feeding said reaction fluid though a spray nozzle, in a dehydration process. United States Patent Application No. 2003/0104109 discloses a method for producing 1,3-diacylglycerol oil from triacylglycerol, comprising mixing the triacylglycerol containing oil with glycerol and a homogenous chemical catalyst comprising an alkali metal salt or alkali earth metal salt of a monocarboxylic acid or a dicarboxylic acid, or a mixture thereof, to achieve glycerolysis, wherein the 1,3-diacylglycerol oil is produced.

Among the above-described processes, however, the technique disclosed in Japanese Patent Application No. 71495/1989, PCT Patent Application No. WO 99/09119, Japanese Patent Application No. 234391/1998, Japanese Patent Application No. 330289/1992 and U.S. Pat. No. 6,361,980, make use of expensive lipases as catalyst for the reaction, and therefore, are difficult to produce diacylglycerol at a low cost; the technique disclosed in Japanese Patent Application No. 330289/1992 involves technical difficulties such as the necessity of stopping the reaction at a specific time when the concentration of diacylglycerol reaches a peak; the technique disclosed in Japanese Patent Application No. 234391/1998 could not obtain sufficient purity of diacylglycerol; the technique disclosed in United States Patent Application No. 2003/0104109 requires an immediate removal of the homogenous chemical catalyst after the reaction by means of neutralization, which is not easy to operate at an industrial level and may lead to diacylglycerol oil loss.

Obesity is a well-known lifestyle disease that is widespread in affluent nations and rapidly on the rise in developing countries. It is often related to many diseases such as diabetes, hyperlipemia, hypertension and ischemic heart diseases. One of the reasons of the onset of obesity lies in the excessive intake of fat in our daily diet, which results in the increased accumulation of body fat.

In view of this situation, numerous fat substitutes or low-calorie fats have been developed to replace or reduce the use of conventional fats. Examples of such fats include sucrose fatty acid esters, alkyl glycoside fatty acid polyesters, dialkyl dihexadecylmolonate, esterified propoxylated glycerol and long-chain and short-chain fatty acids of triacylglycerols. However, such fats do not satisfy important characteristics such as nutritional safety, desirable physical property, heat stability, and flavour; all of which are critical for the fat to be acceptable by consumers. Medium-chain and long-chain fatty acid triacylglycerols have been shown to satisfy all of the above criteria and to lower body fat accumulation, and the production is therefore desirable.

United States Patent Application No. US2004/0191391 discloses a lipase-catalysed reaction process in which an edible oil or fat is transesterified or acidolysed with medium-chain fatty acids or medium-chain fatty acids triacylglycerol. This process makes use of expensive lipases as catalyst for the reaction, and therefore, is difficult to produce medium-chain and long-chain fatty acids triacylglycerol at a low cost.

European Patent Application No. EP1642959 discloses a 3-stage process for preparing high purity symmetrical triacylglycerols comprising of medium-chain fatty acids at sn-1 and sn-3 positions and a long-chain fatty acid at sn-2 position in which, (1) a medium-chain fatty acid triacylglycerol is randomly transesterified with a long-chain fatty acid triacylglycerol in the presence of an enzyme or a chemical catalyst to obtain a reaction product containing a triacylglycerol comprising a medium-chain fatty acid and a long-chain fatty acid, (2) reaction product from (1) is transesterified with an alcohol monoester of a medium-chain fatty acid in the presence of a 1,3-position specific enzyme, and (3) separating the alcohol monoester of the medium-chain fatty acid and the alcohol monoester of the long-chain fatty acid monoester to obtain the symmetrical triacylglycerol composing of medium-chain fatty acids at the sn-1 and sn-3 positions and a long-chain fatty acid at the sn-2 position. This process also makes use of expensive lipases as catalyst and alcohol monoesters of medium-chain fatty acids as raw materials for the transesterification reaction, and therefore, makes the process difficult to produce medium-chain and long-chain fatty acid triacylglycerols at a low cost.

United States Patent Application No. US2004/0171127 discloses a process for producing medium-chain and long-chain fatty acid triacylglycerol comprising of medium-chain fatty acids esterified to the sn-1 and sn-3 positions and a ω-6 series polyunsaturated long-chain fatty acid having 18 or more carbon atoms and 2 or more double bonds, but not containing ω-3 series polyunsaturated fatty acid, esterified to the sn-2 position of the triacylglycerol molecule, by means of enzymatic transesterification of medium-chain fatty acids and an oil or fat containing at least one polyunsaturated fatty acid of the abovementioned type, using an immobilized lipase. Similarly, this process also involves the use of expensive lipases as catalyst, and therefore, increases the overall production cost of medium-chain and long-chain fatty acid triacylglycerols.

In view of the above, it is advantageous to provide a method of producing fats and oil containing acylglycerol esters. This method would be desirable to produce diacylglycerols and/or medium-chain and long-chain fatty acid triacyglycerols at a high yield and low cost in a short period of time, which has potential applications in the continuous commercial production of diacylglycerols and/or triacylglycerols having medium-chain and long-chain fatty acids at industrial level.

SUMMARY OF THE INVENTION

The object of the present invention lies in the production of fats and oil containing acylglycerol esters at a high yield and low cost in a short period of time.

In order to attain the above object, the present inventors have found that diacylglycerols and/or triacylglycerols having medium-chain and long-chain fatty acids can be produced in a method using a chemical catalyst, which prevents degradation of oil quality, such as discolouration, less expensive than enzymatic method, and less complex than known chemical methods.

Accordingly, the present invention broadly provides a production method of an oil and fat containing acylglycerol esters including diacylglycerols and/or medium-chain and long chain fatty acids triacyglycerol comprising esterification reaction between an acyl group donor and an acyl group acceptor to obtain a reaction fluid that is further subjected to dehydration and at least one separation method, wherein the esterification reaction is conducted in the presence of a heterogeneous chemical catalyst consisting of an ion-exchange resin preparation.

In a preferred embodiment of the present invention, there is provided a method of producing diacylglycerol, which comprises:
i) conducting an esterification reaction between an acyl group donor selected from the group consisting of a free fatty acid and an acyl group acceptor selected from the group consisting of a glycerol, a monoacylglycerol, and a mixture thereof, in the presence of a heterogenous chemical catalyst comprising an ion-exchange resin preparation to obtain a reaction fluid, which is further undergone dehydration to reduce water contained therein to obtain a crude diacylglycerol;
ii) separating residual glycerol, free fatty acids and monoacylglycerol from said crude diacylglycerol by way of a separation method; and
iii) separating diacylglycerol from residual triacylglycerol and other undesired compounds by way of another separation method to obtain a high-purity diacylglycerol.

In another preferred embodiment of the present invention, there is provided a method of producing medium-chain and long chain fatty acids triacyglycerol, which comprises:
i) conducting an esterification reaction between an acyl group donor selected from the group consisting of a free fatty acid and an acyl group acceptor selected from the group consisting of a glycerol, a monoacylglycerol, a diacylglycerol, and a mixture thereof, in the presence of a heterogenous chemical catalyst comprising an ion-exchange resin preparation to obtain a reaction fluid, which is further undergone dehydration to reduce water contained therein to obtain a crude medium-chain and long-chain fatty acid triacylglycerol;
ii) separating residual glycerol, free fatty acids, monoacylglycerol and medium-chain fatty acid diacylglycerol from said crude medium-chain and long-chain fatty acid triacylglycerol by way of a separation method; and
iii) separating medium-chain and long-chain fatty acid triacylglycerol from residual long-chain fatty acid triacylglycerol and other undesired compounds by way of another separation method to obtain a medium-chain and long-chain fatty acid triacylglycerol.

Various other objects, features and attendant advantages of the present invention will be more fully appreciated as the same becomes better understood from the following detailed description of the preferred embodiments of the invention.

DESCRIPTION OF THE PREFERRED EMBODIMENTS

The esterification reaction is preferably conducted in the presence of a heterogenous chemical catalyst having an ester activity, such as an ion-exchange resin, preferably a strongly acidic cation exchange resin. Preferable examples thereof include ion-exchange resins derived from styrenic, divinybenzene, acrylic and phenolic polymers. Preferable example of the functional group of the ion-exchange resin includes a strong acid group, such as, for example, sulfonic acid. Commercially available strongly acidic cation exchange resins include "Purolite CT" range of resins (Purolite International Ltd.), "Amberlyst" and "Amberlite" range of resins (Rohm and Haas Co.), "Diaion" range of resins (Mitsubishi Chemical Co.) and "Dowex" range of resins (The Dow Chemical Co.). The ion-exchange resin can be freely mobilized in an agitation tank or packed into a column or tower. Examples of suitable equipment for the esterification reaction include an agitation tank, a fixed bed, and a fluidized tank as well as combinations of these. The reactions can be conducted in a batch-wise, continuous, or semi-continuous manner. No particular limitation is imposed on the form, size and type of strongly acidic cation exchange resins.

The esterification reaction is preferably conducted at a temperature in which degradation of the performance of the ion-exchange resin catalyst and reaction substrates and products are minimal. The reaction temperature in the present invention is from 20° C. to 250° C., preferably from 60° C. to 200° C., more preferably from 100° C. to 150° C.

The reaction time in the present invention is dependent on the reaction temperature. The reaction time may range from 10 minutes to 8 hours. However, due to economic reasons, a reaction time within the range of from 30 minutes to 6 hours is preferred.

The esterification reaction in the present invention is preferably conducted while water formed by the reaction is removed. Examples of suitable equipment for dehydration include a dehydration tank or a molecular distillator. It is preferred that dehydration is conducted in the reaction tank itself, without having to use another separate dehydration tank. In this case, the reaction tank acts as a dehydration tank. Alternatively, dehydration can also be conducted by feeding the reaction fluid to a dehydration tank by means of a spray nozzle and adjusted so as to give an average droplet diameter of at most 5 mm, more preferably at most 2 mm. Dehydration of the reaction fluid conducted using the dehydration tank is conducted in which the water removed therefrom is condensed using an internal condenser or an external condenser. Preferably, the esterification reaction is conducted at the boiling temperature of water or higher for a given pressure so that water formed from the reaction can be easily removed.

Preferably the method for dehydration of the esterification product, i.e. reaction fluid, can be performed at a reduced pressure or under vacuum. No particular limitation is imposed on the form, size and number of dehydration tanks or molecular distillators. Alternatively, dehydration can be performed by various known methods in art, for example, use of dry inert gases, use of molecular sieve and use of chemical compounds that absorbs moisture.

The separation of diacylglycerol, as well as medium-chain and long-chain fatty acid triacyglycerol according to the present invention is conducted by a separation method, such as a distillation method. Preferably, the distillation method is a molecular distillation method or also known as a short-path distillation method. No particular limitation is imposed on the form, size and number of short-path distillators.

In the diacylglycerol production, non-diacylglycerol components contained in the reaction product that include glycerol, free fatty acids and monoacylglycerol, having relatively lower flash points than its corresponding diacylglycerol, can be separated using short-path distillation or conventionally known purification methods of edible oils such as steam distillation. In the medium-chain and long-chain fatty acid triacylglycerol production, other components, such as glycerol, free fatty acids, monoacylglycerol, and diacylglycerol of the reaction product having relatively lower flash points than its corresponding medium-chain and long-chain fatty acid triacylglycerol can be separated using short-path distillation or conventionally known purification methods of edible oils such as steam distillation.

In the diacylglycerol production according to the present invention, economically, monoacylglycerols can be separated and purified, for example, by using short-path distillation method, to be sold either separately or blended into other components. Alternatively, the glycerol, free fatty acids and monoacylglycerols separated from the reaction product can be recycled back as reactants for use in subsequent reactions. The short-path distillation temperature for separating the non-diacylglycerol components such as glycerol, free fatty acids and monoacylglycerol, according to the present invention is from 50 to 210° C., preferably from 100 to 190° C. and more preferably from 150 to 170° C. The short-path distillation temperature for separating diacylglycerol according to the present invention is from 120 to 290° C., preferably from 160 to 275° C. and more preferably from 200 to 260° C. Other non-diacylglycerol components, such as triacylglycerol and undesired coloured compounds, having relatively higher flash points than its corresponding diacylglycerol will remain as residue after short-path distillation of the diacylglycerol, and therefore, can be removed from the diacylglycerol. Preferably, the short-path distillation is conducted at a certain reduced pressure or vacuum, such that the particular compound(s) to be distilled can be distilled off at the given temperature. The degree of reduced pressure or vacuum used for the short-path distillation in the present invention is in the fine vacuum range, for example, from $10^{-1}$ to $10^{-5}$ mbar, preferably from $10^{-3}$ to $10^{-4}$ mbar.

On the other hand, in the production of medium-chain and long chain fatty acid triacyglycerol, economically, monoacylglycerols and diacylglycerols can be separated and purified, for example, by using short-path distillation method, to be sold either separately or blended into other components. Alternatively, the glycerol, free fatty acids, monoacylglycerols and diacylglycerols separated from the reaction product can be recycled back as reactants for use in subsequent reactions. The short-path distillation temperature for separating the components, such as glycerol, free fatty acids, monoacylglycerol and medium-chain fatty acid diacylglycerols, in the present invention is from 50 to 240° C., preferably from 100 to 220° C. and more preferably from 150 to 200° C. The short-path distillation temperature for separating medium-chain and long-chain fatty acid triacylglycerol in the present invention is from 120 to 300° C., preferably from 160 to 285° C., more preferably from 200 to 270° C. Components, such as long-chain fatty acid triacylglycerol and undesired coloured compounds, having relatively higher flash points than its corresponding medium-chain and long-chain fatty acid triacylglycerol will remain as residue after short-path distillation of the medium-chain and long-chain fatty acid triacylglycerol, and therefore, can be removed from the medium-chain and long-chain fatty acid triacylglycerol. Preferably, the short-path distillation is conducted at a certain reduced pressure or vacuum, such that the particular compound(s) to be distilled can be distilled off at the given temperature. The degree of reduced pressure or vacuum used for the short-path distillation in the present invention is in the fine vacuum range, for example, from $10^{-1}$ to $10^{-5}$ mbar, preferably from $10^{-3}$ to $10^{-4}$ mbar.

Colour is an important factor in the edible oil industry. The diacylglycerols as well as medium-chain and long-chain fatty acid triacylglycerols produced from the present invention is very slightly discoloured. Discolouration of the diacylglycerols produced from this invention was observed to be lesser than the diacylglycerols produced using a known chemical catalyst such as potassium acetate. The discolouration of diacylglycerols, medium-chain and long-chain fatty acid triacylglycerols produced from this invention could be minimized further when the reactants and ion-exchange resin catalyst are used with an inert atmosphere in the reactor, either under pressure or without pressure. The process of the invention reacts under inert atmosphere in the reactor with a pressure of 0 to 500 psi. Some examples of inert gases are $CO_2$, $N_2$, Ar, Ne, He, and the like. When an inert gas is used for providing the inert atmosphere in the reactor, a dry inert gas can be used. Subjecting the reactants to vacuum is also a means for conducting the reaction under inert atmosphere. Almost no discolouration was observed with optimized conditions, which for exemplifying purposes only are set forth in the examples that follow.

The acyl group donor, which is a raw material for the reaction used in the present invention, includes a free fatty acid. Preferably, the free fatty acid is obtained from crude, refined or partially refined oil and fat, or mixtures thereof. Partially refined oil and fat described in this invention means the oil and fat obtained from the process of degumming, chemical and/or physical refining, and bleaching.

For diacyglycerol production, preferred examples of free fatty acids include those that are naturally comprised in oils or fats, including those of $C_2$-$C_{24}$ saturated or unsaturated fatty acids or mixtures thereof, such as acetic acid, propionic acid, butyric acid, valeric acid, caproic acid, enanthic acid, caprylic acid, pelargonic acid, capric acid, undecanoic acid, lauric acid, myristic acid, myristoleic acid, palmitic acid, palmitoleic acid, zoomaric acid, stearic acid, oleic acid, elaidic acid, petroselinic acid, linoleic acid, α-linolenic acid, γ-linolenic acid, stearidonic acid, arachidic acid, arachidonic acid, gadoleic acid, arachic acid, dihomo-γ-linolenic acid, eicosapentaenoic acid, behenic acid, erucic acid, adrenic acid, docosapentaenoic acid, docosahexaenoic acid, nervonic acid, or an isomeric form thereof; those derived from vegetable and animal oils or fats selected from the group consisting of canola oil, coconut oil, corn oil, cottonseed oil, palm oil, palm kernel oil, peanut oil, rapeseed oil, safflower oil, soybean oil, sunflower oil, olive oil, rice bran oil, corn bran oil, borage oil, evening primrose oil, flaxseed oil, grape seed oil, linseed oil, argania oil alfalfa oil, almond seed oil, apricot kernel oil, avocado oil, babassu oil, baobab oil, blackcurrant seed oil, brazil nut oil, cocoa seed oil, camellia oil, carrot oil, cashew nut oil, hazelnut oil, hemp seed oil, kiwi seed oil, macadamia nut oil, mango seed oil, melon seed oil, niger seed oil, peach kernel oil, perilla oil, pistachio oil, poppy seed oil, pumpkin seed oil, rambutan seed oil, rosehip oil, sesame oil, shea seed oil, tall oil, walnut oil, wheat germ oil, beef tallow, lard, fish oil, and marine oil; those obtained by processing of oils or fats, hardening, hydrogenation, transesterification, or randomisation, fractionation, distillation, fat splitting; those obtained by process of hydrolysis by means of enzymatic hydrolysis or steam hydrolysis; and mixtures thereof.

For medium-chain and long-chain fatty acid triacylglycerol production, preferred examples of free fatty acids include those that are naturally comprised in oils or fats, including those of $C_6$-$C_{24}$ saturated or unsaturated fatty acids or mixtures thereof, such as caproic acid, enanthic acid, caprylic acid, pelargonic acid, capric acid, undecanoic acid, lauric acid, myristic acid, myristoleic acid, palmitic acid, palmitoleic acid, zoomaric acid, stearic acid, oleic acid, elaidic acid, petroselinic acid, linoleic acid, α-linolenic acid, γ-linolenic acid, stearidonic acid, arachidic acid, arachidonic acid, gadoleic acid, arachic acid, dihomo-γ-linolenic acid, eicosapentaenoic acid, behenic acid, erucic acid, adrenic acid, docosapentaenoic acid, docosahexaenoic acid, nervonic acid, or an isomeric form thereof; those derived from vegetable and animal oils or fats selected from the group consisting of canola oil, coconut oil, corn oil, cottonseed oil, palm oil, palm kernel oil, peanut oil, rapeseed oil, safflower oil, soybean oil, sunflower oil, olive oil, rice bran oil, corn bran oil, borage oil, evening primrose oil, flaxseed oil, grape seed oil, linseed oil, argania oil alfalfa oil, almond seed oil, apricot kernel oil, avocado oil, babassu oil, baobab oil, blackcurrant seed oil, brazil nut oil, cocoa seed oil, camellia oil, carrot oil, cashew nut oil, hazelnut oil, hemp seed oil, kiwi seed oil, macadamia nut oil, mango seed oil, melon seed oil, niger seed oil, peach kernel oil, perilla oil, pistachio oil, poppy seed oil, pumpkin seed oil, rambutan seed oil, rosehip oil, sesame oil, shea seed oil, tall oil, walnut oil, wheat germ oil, beef tallow, lard, fish oil, and marine oil; those obtained by processing of oils or fats, hardening, hydrogenation, transesterification, or randomisation, fractionation, distillation, fat splitting; those obtained by process of hydrolysis by means of enzymatic hydrolysis or steam hydrolysis; and mixtures thereof.

The acyl group acceptor, which is another raw material used in the present invention, includes a glycerol, a monoacylglycerol, or a mixture thereof. No particular limitation is imposed on a mixing ratio of the acyl group donor to the acyl group acceptor. However, the acyl group donor is preferably present within the range of at least 1.0 mol per mol of a glyceryl group of the acyl group acceptor for the diacylglycerol production, and within the range of at least 1.5 mol per mol of a glyceryl group of the acyl group acceptor for the medium-chain and long-chain fatty triacylglycerol production.

A monoacylglycerol may be added to the mixture of the raw materials in the production of diacylglycerol, while a monoacylglycerol and/or diacylglycerol may be added to the mixture of the raw materials in the production of medium-chain and long-chain fatty acid triacylglycerol. These additions enhance the solubility of glycerol in the free fatty acid phase. When added, however, the solubility of glycerol in the free fatty acid phase becomes high from the initial stage of the reaction, so that the reaction rate is enhanced.

When the reaction is completed, the ion-exchange resin catalyst is separated from the reaction products. The separated ion-exchange resin can be repeatedly used for the reaction. After prolonged usage of the resin, performance of the resin may decrease. Regeneration and bleaching of the ion-exchange resin can be carried out by subjecting the resin to a strong acid, such as, for example, sulfuric acid. After regeneration and bleaching, the ion-exchange resin can be reused for the reaction.

A solvent such as hexane, octane or petroleum may also be used in the reaction of the acyl group donor with the acyl group acceptor according to the present invention. However, preferably, no such solvent is added. In order to inhibit hydrolysis, it is also preferred that no water other than water contained in the resin preparation and raw materials for the reaction is added to the reaction system.

Methods for the esterification process performed to the free fatty acid with glycerol used in the present invention are not particularly limited as long as at least one diacylglycerol, and/or at least one medium-chain and long-chain fatty acid triacylglycerol can be obtained therefrom, The esterification reaction can be preferably performed until a diacylglycerol purity of at least 80% is reached, and a medium-chain and long-chain fatty acid triacylglycerol composition of at least 80% is reached. Diacylglycerol purity, which in this invention is defined as a ratio of diacylglycerol wt. % to diacylglycerol wt. %+triacylglycerol wt. %)×100, is used to measure the diacylglycerol concentration of the refined oil or fat composition used in this invention. According to this invention, diacylglycerol purity of 80% or higher can be obtained. The resultant product may also comprise of a small proportion of triacylglycerols. On the other hand, the resultant product of medium-chain and long-chain fatty acid triacylglycerol may also comprise a small proportion of long-chain diacylglycerol.

The following provides a more detailed explanation of the invention by way of examples. However, the present invention is not limited to these examples, as those of ordinary skill in the art will recognize the relationship between pressure, temperature and time, and, with the guidance provided by the present disclosure, will be able to optimize the process parameters for particular situations and variations of the invention without undue experimentation.

EXAMPLE 1

Production of Diacylglycerol Esters 600 g of free fatty acids derived from canola oil, 195 g of glycerol and 79.5 g of dry Purolite CT276DR strongly acidic cation exchange resin were vigorously mixed in a 2 L round bottom flask and heated at a temperature of 110° C. to conduct the esterification reaction. The reaction was sparged with nitrogen gas. After 3.5 hours of reaction, the reaction mixture was cooled before it was filtered to separate the oil phase from the ion-exchange resin.

The oil phase was subjected to short-path distillation to separate glycerol, free fatty acids and monoacylglycerols. The distillation temperature was set at 160° C. Feed flow rate was set at 250 mL/h. The glycerol, free fatty acids and monoacylglycerols were separated as Distillate 1. The diacylglycerol oil remained as the residue (Residue 1).

Residue 1 was subjected to short-path distillation to separate the diacylglycerol oil. The distillation temperature was set at 210° C. Feed flow rate was set at 250 mL/h. The diacylglycerol oil was separated as Distillate 2. Triacylglycerol and other undesired components remained as the residue (Residue 2). The results are shown in Table 1.

COMPARATIVE EXAMPLE 1

600 g of free fatty acids derived from canola oil, 195 g of glycerol and 79.5 g of Lipozyme RM IM (Novozymes) immobilized lipase were vigorously mixed in a 2 L round bottom flask and heated to a temperature of 60° C. to conduct the esterification reaction. The reaction was sparged with nitrogen gas. After 5 hours of reaction, the reaction mixture was cooled before it was centrifuged to separate the oil phase from immobilized lipase. The results are shown in Table 1.

COMPARATIVE EXAMPLE 2

600 g of refined, bleached and deodorised canola oil, 120 g of glycerol and 1.5 g of potassium acetate were vigorously mixed in a 2 L round bottom flask and heated to a temperature of 220° C. to conduct the glycerolysis reaction. The reaction was sparged with carbon dioxide gas. After 2 hours of reaction, the reaction mixture was cooled before it was centrifuged to separate the oil phase from the potassium acetate. The results are shown in Table 1.

Determination of free fatty acid, monoacylglycerol, diacylglycerol and triacylglycerol content using high-performance liquid chromatography and colour measurement using a Lovibond Tintometer were performed. The results are shown in Table 1.

TABLE 1

|  | Product of Ex. 1 | Product of Com. Ex. 1 | Product of Com. Ex. 2 | Refined Canola oil |
|---|---|---|---|---|
| Fatty acids and glycerol (%) | 25.60 | 22.35 | 7.50 | 0.01 |
| Monoacylglycerols (%) | 6.90 | 16.30 | 42.90 | 0.13 |
| Diacylglycerols (%) | 54.30 | 52.50 | 41.80 | 0.55 |
| Triacylglycerols (%) | 13.20 | 8.85 | 7.80 | 99.31 |
| Diacylglycerol purity (%) | 89.26 | 85.57 | 84.27 | 0.55 |
| Colour Red | 0.5 | 0.5 | 0.7 | 0.5 |
| Colour Yellow | 4.3 | 4.5 | 6.8 | 3.9 |

Comparison of Processes

In a known process of diacylglycerol manufacture using potassium acetate as catalyst, incomplete removal of the potassium acetate catalyst can cause glyceride reversion leading to a decrease in diacylglycerol and an increase in triacylglycerol in the final product. Several approaches, which involve neutralization, filtration, adsorption, and/or centrifugation steps, were suggested to sufficiently remove the potassium acetate catalyst. These tedious processing steps will definitely increase the cost of the final product. In the present invention, the heterogenous form of the ion-exchange resin catalyst allows the catalyst to be easily and completely removed from the products of the reaction simply by filtration, hence, eliminating the problem of glyceride reversion.

Cost is one of the important factors of an industrial process. Generally, it is desirable to keep the process cost as low as possible. Table 2 shows a comparison of the estimated process cost of this invention between that of an enzymatic process and a chemical process for the production of diacylglycerol.

TABLE 2

| | Raw Materials Cost (USD/unit) | This Invention Dosage (Units/t oil) | This Invention Cost (USD/t oil) | Enzymatic Esterification Dosage (Units/t oil) | Enzymatic Esterification Cost (USD/t oil) | Chemical Glycerolysis Dosage (Units/t oil) | Chemical Glycerolysis Cost (USD/t oil) |
|---|---|---|---|---|---|---|---|
| Catalyst | | | | | | | |
| Ion-exchange Resin | 80/kg | 100 kg | 19.9 | | | | |
| Enzyme | 600/kg | | | 80 kg | 381 | | |
| CH$_3$COOK | 4/kg | | | | | 2.5 kg | 10 |
| Post refining | | | | | | | |
| Oil loss | 0.7/kg | 5 kg | 3.5 | 5 kg | 3.5 | 10 kg | 7 |
| Bleaching earth | 0.5/kg | 0 kg | 0 | 0 kg | 0 | 3 kg | 1.5 |

TABLE 2-continued

| | Raw Materials Cost (USD/unit) | This Invention Dosage (Units/t oil) | This Invention Cost (USD/t oil) | Enzymatic Esterification Dosage (Units/t oil) | Enzymatic Esterification Cost (USD/t oil) | Chemical Glycerolysis Dosage (Units/t oil) | Chemical Glycerolysis Cost (USD/t oil) |
|---|---|---|---|---|---|---|---|
| Citric acid | 1.5/kg | 0 kg | 0 | 0 kg | 0 | 1 kg | 1.5 |
| Utilities | | | | | | | |
| Electricity | 0.07/kWh | 15 kWh | 1.05 | 5 kWh | 0.35 | 50 kWh | 3.5 |
| Steam | 0.02/kg | 30 kg | 0.6 | 10 kg | 0.2 | 150 kg | 3 |
| Water, air, nitrogen | | | 0.5 | | 0.5 | | 0.5 |
| Environmental | | | | | | | |
| Bleaching earth | 0.14/kg | 0 kg | 0 | 0 kg | 0 | 3 kg | 0.42 |
| Disposal | | | | | | | |
| Maintenance | | | | | | | |
| Manpower | 40000/man yr | 0.00005 man yr | 1.82 | 0.00005 man yr | 1.82 | 0.00005 man yr | 1.82 |
| Repairs | 0.45 | 1 | 0.45 | 1 | 0.45 | 1 | 0.45 |
| Cost (USD/t of oil) | | | 27.82 | | 387.82 | | 29.69 |

EXAMPLE 2

Production of Medium-Chain and Long-Chain Fatty Acid Triacyglycerol Esters 96 g of caprylic acid, 376 g of oleic acid, 46 g of glycerol and 47.2 g of dry Purolite CT276DR strongly acidic cation exchange resin were vigorously mixed in a 1 L round bottom flask and heated to a temperature of 110° C. to conduct the esterification reaction. The reaction was sparged with nitrogen gas. After 5 hours of reaction, the reaction mixture was cooled before it was filtered to separate the oil phase from the ion-exchange resin.

The oil phase was subjected to short-path distillation to separate glycerol, free fatty acids, monoacylglycerols and medium-chain fatty acid diacylglycerol. The distillation temperature was set at 200° C. Feed flow rate was set at 250 mL/h, The glycerol, free fatty acids, monoacylglycerols and medium-chain fatty acid diacylglycerol were separated as Distillate 1. The medium-chain and long-chain fatty acid triacylglycerol remained as the residue (Residue 1).

Residue 1 was subjected to short-path distillation to separate the medium-chain and long-chain fatty acid triacylglycerol. The distillation temperature was set at 260° C. Feed flow rate was set at 250 mL/h. The medium-chain and long-chain fatty acid triacylglycerol was separated as Distillate 2. Long-chain fatty acid triacylglycerol and other undesired components remained as the residue (Residue 2). The results are shown in Table 3.

COMPARATIVE EXAMPLE 1

96 g of capryllic acid, 376 g of oleic acid, 76 g of glycerol and 47.2 g of Lipozyme RM IM (Novozymes) immobilized lipase were vigorously mixed in a 1 L round bottom flask and heated to a temperature of 60° C. to conduct the esterification reaction. The reaction was sparged with nitrogen gas. After 12 hours of reaction, the reaction mixture was cooled before it was centrifuged to separate the oil phase from immobilized lipase. The results are shown in Table 3.

Determination of free fatty acid, monoacylglycerol, diacylglycerol and triacylglycerol content using gas liquid chromatography and colour measurement using a Lovibond Tintometer were performed. The results are shown in Table 3.

TABLE 3

| | Product of Ex. 2 | Product of Com. Ex. 2 | Refined Canola oil |
|---|---|---|---|
| Fatty acids and glycerol (%) | 20.4 | 13.9 | 0.01 |
| Monoacylglycerols (%) | 5.9 | 6.3 | 0.13 |
| Diacylglycerols (%) | 14.3 | 12.5 | 0.55 |
| Medium-chain and long-chain fatty acid triacylglycerols (%) | 50.2 | 58.8 | 0.00 |
| Long-chain fatty acid triacylglycerol (%) | 9.2 | 8.5 | 99.3 |
| Colour Red | 0.5 | 0.5 | 0.5 |
| Colour Yellow | 4.3 | 4.5 | 3.9 |

Comparison of Processes

Cost is one of the important factors of an industrial process. Generally, it is desirable to keep the process cost as low as possible. Table 4 shows a comparison of the estimated process cost of this invention between that of an enzymatic process for the production of medium-chain and long-chain fatty acid triacylglycerol.

TABLE 4

| | Raw Materials Cost (USD/unit) | This Invention Dosage (Units/t oil) | This Invention Cost (USD/t oil) | Enzymatic Esterification Dosage (Units/t oil) | Enzymatic Esterification Cost (USD/t oil) |
|---|---|---|---|---|---|
| Catalyst | | | | | |
| Ion-exchange Resin | 80/kg | 100 kg | 19.9 | | |
| Enzyme | 600/kg | | | 80 kg | 381 |

TABLE 4-continued

| | Raw Materials | This Invention | | Enzymatic Esterification | |
|---|---|---|---|---|---|
| | Cost (USD/unit) | Dosage (Units/t oil) | Cost (USD/t oil) | Dosage (Units/t oil) | Cost (USD/t oil) |
| Post refining | | | | | |
| Oil loss | 0.7/kg | 5 kg | 3.5 | 5 kg | 3.5 |
| Bleaching earth | 0.5/kg | 0 kg | 0 | 0 kg | 0 |
| Citric acid | 1.5/kg | 0 kg | 0 | 0 kg | 0 |
| Utilities | | | | | |
| Electricity | 0.07/kWh | 15 kWh | 1.05 | 5 kWh | 0.35 |
| Steam | 0.02/kg | 30 kg | 0.6 | 10 kg | 0.2 |
| Water, air, nitrogen | | | 0.5 | | 0.5 |
| Environmental | | | | | |
| Bleaching earth disposal | 0.14/kg | 0 kg | 0 | 0 kg | 0 |
| Maintenance | | | | | |
| Manpower | 40000/man yr | 0.00005 man yr | 1.82 | 0.00005 man yr | 1.82 |
| Repairs | 0.45 | 1 | 0.45 | 1 | 0.45 |
| Cost (USD/t of oil) | | | 27.82 | | 387.82 |

Having now fully described the present invention, it will be understood by those of ordinary skill in the art that this invention can be performed within a wide and equivalent range of conditions, formulations, and parameters without effecting the scope of the invention as set forth herein.

The invention claimed is:

1. A production method of making diacylglycerols and/or medium-chain and long-chain fatty acid triacyglycerols comprising an esterification reaction between an acyl group donor and an acyl group acceptor to obtain a reaction fluid that is further subjected to dehydration and at least one separation method; wherein said esterification reaction is conducted in the presence of a heterogeneous chemical catalyst consisting of an ion-exchange resin preparation.

2. A method according to claim 1, wherein said ion-exchange resin is a strongly acidic cation exchange resin.

3. A method according to claim 2, wherein said strongly acidic cation exchange resin comprises a sulfonic acid functional group.

4. A method according to claim 1, wherein said ion-exchange resin can be regenerated and/or bleached for reuse by subjecting to a strong acid.

5. A method according to claim 1, wherein said esterification reaction is conducted at 60° C. to 200° C.

6. A method according to claim 5, wherein said esterification reaction is conducted at 100° C. to 150° C.

7. A method according to claim 1, wherein said esterification reaction is conducted at a pressure between 0 and 500 psi.

8. A method according to claim 1, wherein said esterification reaction is conducted in the presence of an inert atmosphere.

9. A method according to claim 1, wherein said acyl donor is a free fatty acid that can be obtained from the group comprising of crude, refined or partially refined oils and fats, and mixtures thereof.

10. A method according to claim 9, wherein said group is selected from saturated or unsaturated fatty acids having 2 to 24 carbon atoms for the production of diacylglycerol esters, and from saturated or unsaturated fatty acids having 6 to 24 carbon atoms for the production of medium-chain and long-chain fatty acid triacyglycerol esters.

11. A method according to claim 10, wherein said saturated or unsaturated fatty acids having 2 to 24 carbon atoms are chosen from acetic acid, propionic acid, butyric acid, valerie acid, caproic acid, enanthic acid, caprylic acid, pelargonic acid, capric acid, undecanoic acid, lauric acid, myristic acid, myristoleic acid, palmitic acid, paimitoleic acid, zoomaric acid, stearic acid, oleic acid, elaidic acid, petroselinic acid, linoleic acid, α-linolenic acid, γ-linolenic acid, stearidonic acid, arachidic acid, arachidonic acid, gadoleic acid, arachic acid, dihomo-γ-linolenic acid, eicosapentaenoic acid, behenic acid, erucic acid, adrenic acid, docosapentaenoic acid, docosahexaenoic acid, nervonic acid, or an isomeric form thereof; fatty acids derived from vegetable and animal oils or fats selected from the group consisting of canola oil, coconut oil, corn oil, cottonseed oil, palm oil, palm kernel oil, peanut oil, rapeseed oil, safflower oil, soybean oil, sunflower oil, olive oil, rice bran oil, corn bran oil, borage oil, evening primrose oil, flaxseed oil, grape seed oil, linseed oil, argania oil alfalfa oil, almond seed oil, apricot kernel oil, avocado oil, babassu oil, baobab oil, blackcurrant seed oil, brazil nut oil, cocoa seed oil, camellia oil, carrot oil, cashew nut oil, hazelnut oil, hemp seed oil, kiwi seed oil, macadamia nut oil, mango seed oil, melon seed oil, niger seed oil, peach kernel oil, perilla oil, pistachio oil, poppy seed oil, pumpkin seed oil, rambutan seed oil, rosehip oil, sesame oil, shea seed oil, tall oil, walnut oil and wheat germ oil, beef tallow, lard, fish oil, and marine oil; those obtained by processing of oils or fats, hardening, hydrogenation, transesterification, or randomisation, fractionation, distillation, fat splitting; those obtained by process of hydrolysis by enzymatic hydrolysis or steam hydrolysis; and mixtures thereof.

12. A method according to claim 10, wherein said saturated or unsaturated fatty acids having 6 to 24 carbon atoms are chosen from caproic acid, enanthic acid, caprylic acid, pelargonic acid, capric acid, undecanoic acid, lauric acid, myristic acid, myristoleic acid, palmitic acid, palmitoleic acid, zoomaric acid, stearic acid, oleic acid, elaidic acid, petroselinic acid, linoleic acid, α-linolenic acid, γ-linolenic acid, stearidonic acid, arachidic acid, arachidonic acid, gadoleic acid, arachic acid, dihomo-γ-linolenic acid, eicosapentaenoic acid, behenic acid, erucic acid, adrenic acid, docosapentaenoic acid, docosahexaenoic acid, nervonic acid, or an isomeric form thereof; fatty acids derived from vegetable and animal oils or fats selected from the group consisting of canola oil, coconut oil, corn oil, cottonseed oil, palm oil, palm kernel oil, peanut oil, rapeseed oil, safflower oil, soybean oil, sunflower oil, olive oil, rice bran oil, corn bran oil, borage oil, evening primrose oil, flaxseed oil, grape seed oil, linseed oil, argania oil, alfalfa oil, almond seed oil, apricot kernel oil, avocado oil, babassu oil, baobab oil, blackcurrant seed oil, brazil nut oil, cocoa seed oil, camellia oil, carrot oil, cashew nut oil, hazelnut oil, hemp seed oil, kiwi seed oil, macadamia nut oil, mango seed oil, melon seed oil, niger seed oil, peach kernel oil, perilla oil, pistachio oil, poppy seed oil, pumpkin seed oil, rambutan seed oil, rosehip oil, sesame oil, shea seed oil, tall oil, walnut oil and wheat germ oil, beef tallow, lard, fish oil, and marine oil; those obtained by processing of oils or fats, hardening, hydrogenation, transesterification, or randomisation, fractionation, distillation, fat splitting; those obtained by process of hydrolysis by enzymatic hydrolysis or steam hydrolysis; and mixtures thereof.

13. A method according to claim 1, wherein said acyl group acceptor is selected from the group consisting of a glycerol, a monoacylglycerol and a mixture thereof, for the production diacylglycerol esters.

14. A method according to claim 1, wherein said acyl group acceptor is selected from the group consisting of a glycerol, a monoacylglycerol, a diacylglycerol and a mixture thereof, for the production of medium-chain and long-chain fatty acid triacyglycerol esters.

15. A method according to claim 1, wherein said acyl group donor is present in an amount ranging from at least 1 mol per mol of a glyceryl group of said acyl group acceptor.

16. A method according to claim 1, wherein said esterification reaction is carried out in the presence of a monoacylglycerol for the production of diacylglycerol esters.

17. A method according to claim 1, wherein said esterification reaction is carried out in the presence of a monoacylglycerol and a diacylglycerol for the production of medium-chain and long-chain fatty acid triacyglycerol esters.

18. A method according to claim 1, wherein said dehydration, which reduces water content in said reaction fluid, is carried out by way of vacuum, molecular distillation, molecular sieve, dry inert gas of chemical compounds.

19. A method according to claim 1, wherein for the production of diacylglycerol esters, the separation method for separating residual glycerol, free fatty acids and monoacylglycerol is steam distillation or molecular distillation; and the separation method for separating diacylglycerol from residual triacylglycerol and other undesired compounds is molecular distillation or short-path distillation.

20. A method according to claim 1, wherein for the production of medium-chain and long-chain fatty acid triaryglycerol esters, the separation method for separating residual glycerol, free fatty acids, monoacylglycerol and medium-chain fatty acid diacylglycerol is steam distillation or molecular distillation; and the separation method for separating medium-chain and long-chain fatty acid triacylglycerol from residual long-chain fatty acid triacylglycerol and other undesired compounds is molecular distillation or short-path distillation.

21. A method according to claim 1, wherein said ion-exchange resin is derived from at least one selected the group consisting of styrenic, divinylbenxene, acrylic and phenolic polymers.

\* \* \* \* \*